United States Patent [19]

Ottaviano

[11] 4,314,865

[45] Feb. 9, 1982

[54] METHOD OF MAKING CUSHIONING DUNNAGE

[75] Inventor: Gary W. Ottaviano, Bedford Heights, Ohio

[73] Assignee: Ranpak Corp., Willoughby, Ohio

[21] Appl. No.: 75,662

[22] Filed: Sep. 14, 1979

[51] Int. Cl.³ .................. B32B 3/28; B32B 31/00
[52] U.S. Cl. ........................... 156/145; 156/210;
156/308.2; 156/308.4; 156/309.9; 156/322;
428/166; 428/172; 428/178
[58] Field of Search .............. 428/166, 172, 178, 315;
156/145, 282, 209, 210, 322, 308.4, 308.2, 309.9

[56] References Cited

U.S. PATENT DOCUMENTS

| | | | |
|---|---|---|---|
| 3,018,015 | 1/1962 | Agriss et al. | 217/53 |
| 3,142,599 | 7/1964 | Chavannes | 156/210 |
| 3,231,454 | 1/1966 | Williams | 161/110 |
| 3,285,793 | 11/1966 | Chavannes | 156/210 |
| 3,349,990 | 10/1967 | Woodford | 229/55 |
| 3,389,534 | 6/1968 | Pendleton | 53/180 |
| 3,392,081 | 7/1968 | Chavannes | 161/127 |
| 3,416,984 | 12/1968 | Chavannes et al. | 156/209 |
| 3,523,055 | 8/1970 | Lemelson | 161/43 |
| 3,575,781 | 4/1971 | Pezely | 161/131 |
| 3,577,305 | 5/1971 | Hinos et al. | 161/4 |
| 3,616,155 | 10/1971 | Chavannes | 161/168 |
| 3,785,899 | 1/1974 | Fielding | 156/209 |
| 3,817,803 | 6/1974 | Horsky | 156/85 |
| 3,837,990 | 9/1974 | McConnell et al. | 161/68 |
| 3,837,991 | 9/1974 | Evans | 161/68 |
| 3,868,056 | 2/1975 | Keren | 229/55 |
| 4,076,872 | 2/1978 | Lewicki et al. | 428/178 |
| 4,096,306 | 6/1978 | Larson | 428/178 |

FOREIGN PATENT DOCUMENTS 160551 1/1955 Australia .

Primary Examiner—Paul J. Thibodeau
Attorney, Agent, or Firm—Baldwin, Egan, Walling & Fetzer

[57] ABSTRACT

A method and apparatus for the production of air cell cushioning dunnage material, for protective cushioning purposes in packaging or other purposes, with the air cell product possessing substantial strength, and the ability to retain its original thickness under load. The method and apparatus are such that the apparatus can be halted in its operation without injurious effects to the dunnage product being produced, and can be restarted to again commence production of the cushioning dunnage product. The apparatus and method utilize flexible thermoplastic sheets or film of material, to produce the air cell product, with the plastic sheets being preferably formed of a composite of an intermediate stratum of relatively high density high melting point plastic, and exterior stratums of relatively low density, low melting point thermoplastic bonded to the intermediate stratum. Various other embodiments of flexible air cell sheeting are also disclosed.

23 Claims, 26 Drawing Figures

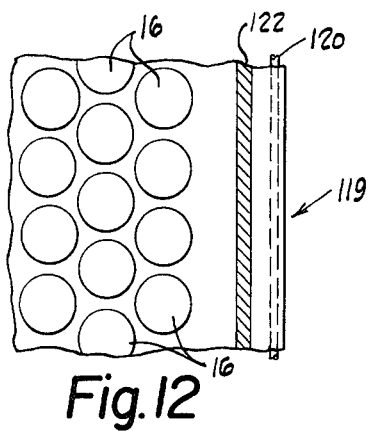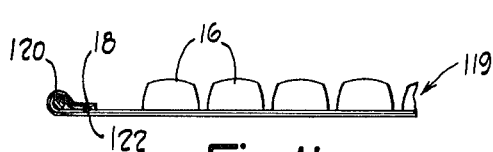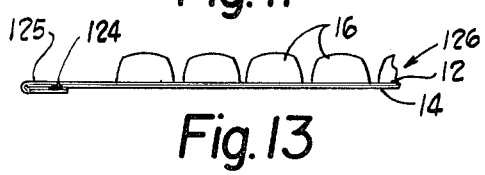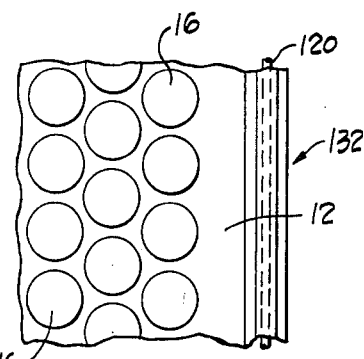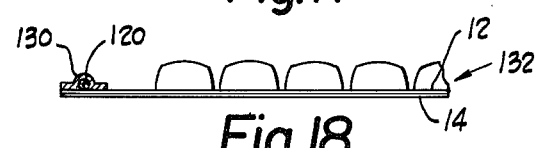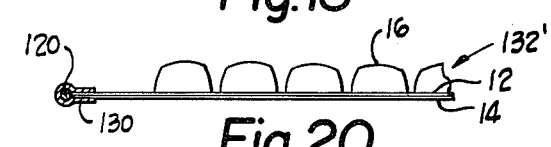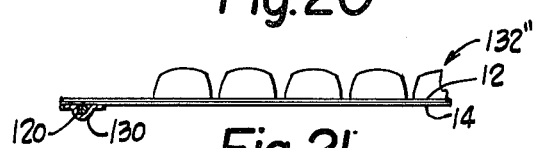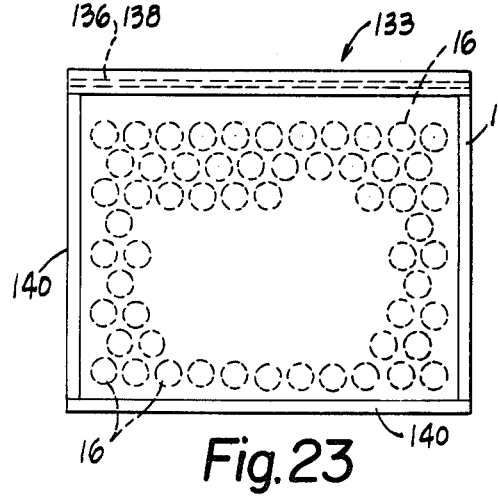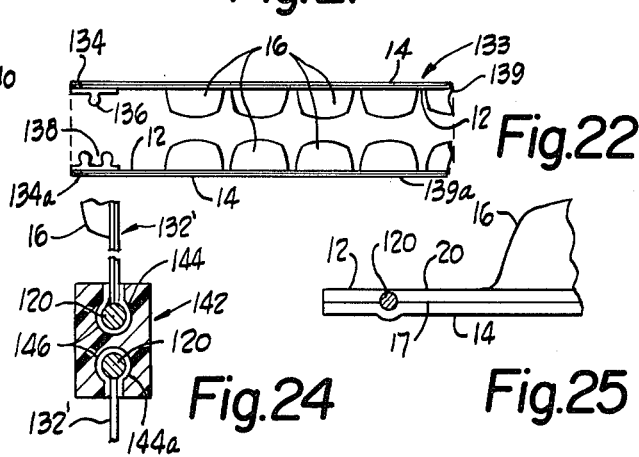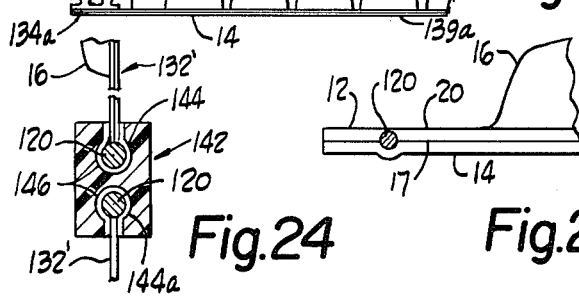

METHOD OF MAKING CUSHIONING DUNNAGE

This invention relates to an improved method and apparatus for the production of air cell sheeting material formed of flexible plastic sheet or film, and an improved cushioning dunnage product and other air cell products, produced therefrom, and more particularly relates to an apparatus and method which enables the operation of the apparatus to be expeditiously performed, and including the ability to interrupt the operation, without effecting the workability of the apparatus and/or method when the latter are reinitiated after termination of the interruption, and which results in a product of high strength, possessing the ability to retain its originally formed thickness over a relatively long period of time and under load, without losing any substantial amount of air from the air cells of the produced product.

BACKGROUND OF THE INVENTION

It is well known in the prior art to produce an air cell cushioning dunnage product utilizing flexible plastic sheet material and embossing one of the sheets, and applying a laminating or cover sheet thereto, for sealing formation of the air cells, with the product being utilized in cushioning applications. U.S. Pat. No. 3,416,984 dated Dec. 17, 1968 and entitled Method and Apparatus For Making Cellular Material From Thermoplastic Sheets is an example of such prior art.

In such patent, a heat sealable plastic sheet is heated to bring its outer surface to a temperature in the vicinity of the fusion or melting temperature thereof, and is embossed on a vacuum drum, with the other surface of the embossed sheet being maintained at about the fusion temperature of the plastic, and then the laminating sheet is applied to the embossed sheet while the latter is on the embossing drum, with the surface of the laminating sheet which is to contact the embossed sheet being at a temperature above the fusion temperature thereof, so that when the laminating sheet is applied to the embossed sheet, the contacting surfaces will equalize at a temperature at least equal to the fusion temperature, thus adhering or sealing the films together.

U.S. Pat. No. 3,392,081 discloses a multi-laminate cushioning product formed of a plurality of layers of material including a high density plastic layer and a lower density low melting point plastic layer, with the high density plastic layer being selected from the group consisting of polyvinylidene chloride and polyethylene, and the low density plastic layer being selected from the group consisting of polyethylene, polypropylene and polyethylene terephthalate.

Moreover, there are considerable other patents in the air cell cushioning dunnage field, such as for instance Australian Pat. No. 160,551 published Oct. 29, 1953, and U.S. Pat. Nos. 3,018,015; 3,142,599; 3,231,454; 3,285,793; 3,349,990; 3,577,305; 3,389,534; 3,523,055; 3,575,781; 3,616,155; 3,785,899; 3,817,803; 3,837,990; 3,837,991; 3,868,056; 4,076,872 and 4,096,306.

The prior art air cell products do not possess the strength of the product of the present invention, and the prior art methods and apparatus are not generally of the type which can be readily and conveniently interrupted in operation and then restarted, without having considerable undesirable effects upon the resultant product, on the stock material utilized to produce the product, and/or on the mechanism or apparatus per se.

SUMMARY OF THE INVENTION

The present invention provides a novel method and an apparatus for the production of air cell flexible sheeting material, and a novel air cell dunnage product formed from multi-stratum flexible plastic sheet, having high strength and high resistance to loss of air from the cells, and an apparatus and method which provides for expeditious production of the cushioning dunnage product and wherein the apparatus can be conveniently interrupted in its operation without material harmful effects on the plastic sheet or film stock material utilized for the apparatus and for the method in the production of the product.

Accordingly, an object of the invention is to provide a novel method for the production of air cell flexible sheeting material, for use, for instance, in protective packaging applications, as well as in other applications.

A still further object of the invention is to provide a novel apparatus for the production of air cell material and one wherein the apparatus is relatively compact and can be selectively interrupted in its production process without harmful effects on the stock material utilized to produce the product, or on the apparatus, or on the resultant product.

A still further object of the invention is to provide a novel flexible air cell plastic film product which has high strength and high resistance to escape of air from the air cells, and which is formed of layers of flexible plastic material, with each layer being a composite of an intermediate stratum of relatively high density high melting point plastic, and exterior stratums bonded to the intermediate stratum and formed of relatively low density, relatively low melting point thermoplastic, and with the product side edge margins of predetermined width Other objects and advantages of the invention will be apparent from the following description taken in conjunction with the accompanying drawings wherein,

BRIEF DESCRIPTION OF THE DRAWINGS

FIGS. 11 to 26 are fragmentary illustrations of various other embodiments of air cell flexible plastic sheeting products which may be produced on the mechanism of FIG. 7 and utilizing the method of the invention, with such air cell products including means along the margins of the produced air cell product for stiffening the edges and/or providing a convenient arrangement for connecting the latter to confronting air cell sheeting, to selectively form, for instance, envelopes of the flexible air cell material.

DESCRIPTION OF PREFERRED EMBODIMENTS

Figure 1:
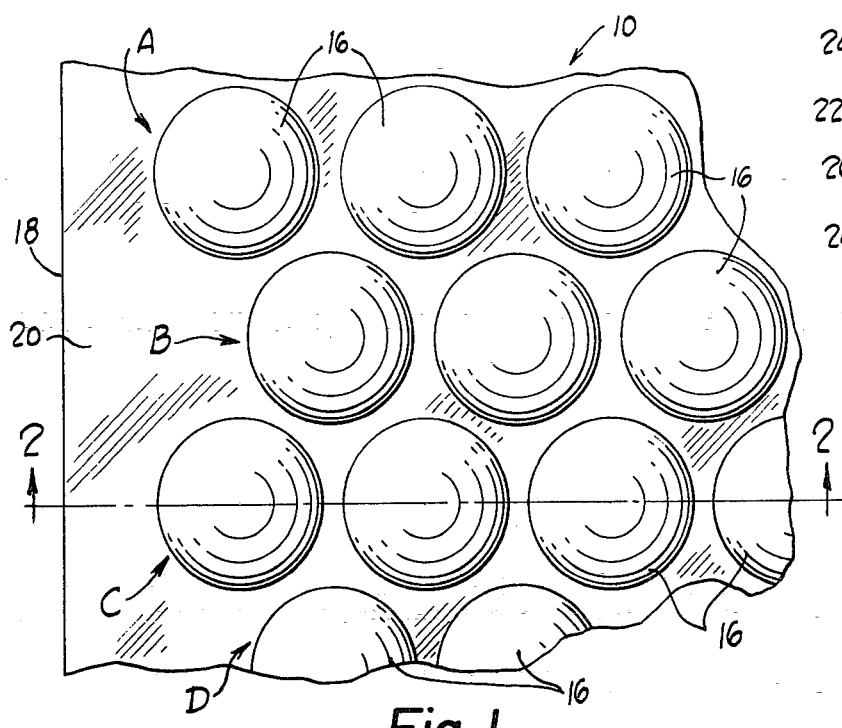
FIG. 1 is a top plan fragmentary view of a section of the cushioning dunnage material as produced by the method and apparatus.
Figure 2:
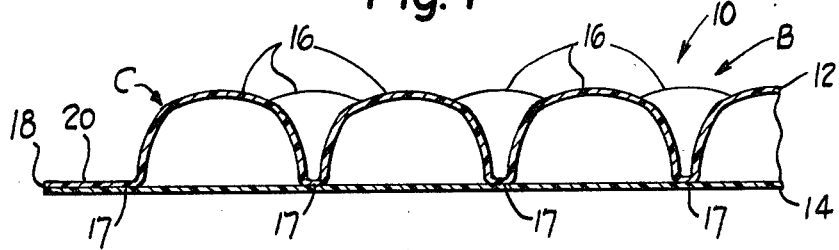
FIG. 2 is a sectional view taken generally along the plane of line 2—2 of FIG. 1, looking in the direction of the arrows.
Figure 3:
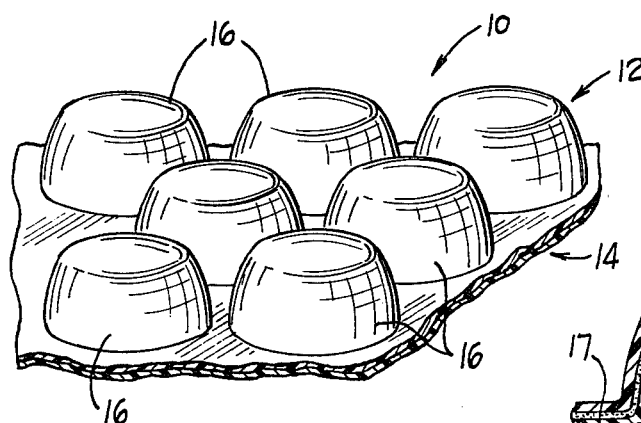
FIG. 3 is a fragmentary, perspective view of the cushioning dunnage material.

Referring now again to FIG. 1, there is illustrated a plan view of a cushioning product 10 provided in accordance with the invention. The product is formed of two sheets 12 and 14 of flexible plastic material, with one of the sheets (i.e. 12) having been embossed to define relatively closely spaced cells 16 which are adapted to contain air which is entrapped by the laminating or cover sheet 14. Sheets 12 and 14 are heat sealed to one another at spaced areas 17 (FIG. 2). As can be best seen in FIG. 1, the cells 16 are preferably arranged in rows (e.g. A, B, C, D) which are preferably staggered with respect to one another and with respect to the side edge 18 of the strip of dunnage, with there being preferably provided along each side edge of the formed strip of cushioning dunnage a substantial width area 20 prior to commencement of the rows of air cells 16. The width of area 20 commencing at edge 18 and extending to the confronting periphery of the closest air cell, may be in the range of from about 0.125 to about 1 inch, but preferably is in the range of from about 0.35 to 0.5 inch for a two foot wide strip of dunnage.

Each of the air cells 16 is of general dome shaped configuration, as shown, and is, in the embodiment illustrated, filled with air, which provides a cushioning effect when the product 10 is utilized for instance in packaging around a product, so as to cushion the product from vibration and/or shock damage. Referring now to FIG. 2, each of the air cells 16 illustrated is preferably approximately 5/16 to ½ inch high by approximately 1-3/16 inches in diameter, with air filling the respective air cell and maintaining the walls of the air cell in the generally domed configuration illustrated. However, various heights and diameters of cells may be provided.

Figure 4:
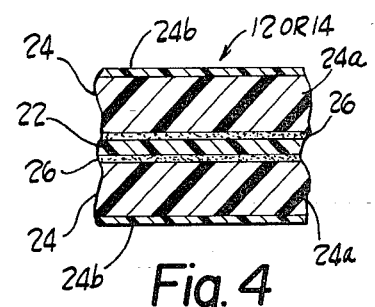
FIG. 4 is an enlarged, vertical sectional view taken through one of the flexible plastic sheets utilized in the production of the product, illustrating the layers or stratums of plastic materials utilized in a sheet or film of plastic stock material.

Referring now to FIG. 4, each of the sheets 12 and 14 used in formation of the product may be and preferably is, formed of an intermediate stratum 22 of the flexible nylon and exterior stratums 24 of polyethylene. The sheet of film is preferably made by a known cast coextrusion method, with the intermediate nylon stratum being of a relatively high density relatively high melting point (e.g. 490° F.) material substantially impervious to the passage of gases therethrough, while the polyethylene stratums are formed of relatively low density polyethylene plastic having a relatively low melting point (e.g. 230 F.). The nylon content can be 10% 20% 30% of the overall thickness of the structure and the exterior polyethylene layers 24 generally equally divide the balance of the thickness of the sheet material. The overall thickness of the sheet material may vary from say for instance 1 and ½ mils to approximately 8 mils, but it is preferable that for use as a cushioning dunnage product, the embossed or domed sheet 12 be between approximately 2 to 8 mils thickness, while the laminating or base cover sheet 14 be between approximately 1.5 to 4 mils thickness, preferably being of a lesser thickness as compared to the embossed sheet 12, but at least being of no greater thickness. The stock sheet of film has an impact strength of from approximately 310 to 300 grams, and a tensile strength in pounds per square inch of from 3400 to approximately 6200, depending on the percentage of nylon in the sheet. A sheet with the higher percentage of nylon, such as for 30% nylon, has the greater tensile strength. The exterior stratums 24 of the sheet will commence to become tacky or "soft" at approximately 160 F. and will melt, as aforementioned, at approximately 230 F.

In the sheet stock material illustrated, the nylon layer 22 is bonded to the exterior heat sealable layers 24 by a binder coating 26, the thickness of each of which in the embodiment shown represents about 5% of the overall thickness of the sheet stock. Moreover, each of the exterior polyethylene layers 24 preferably comprises an inner section 24a of combined low density virgin and recycled polyethylene and a relatively thin (e.g. 5% of the overall sheet thickness) outer section 24b of low density virgin polyethylene bonded together. The thickness of the intermediate stratum 22 is less than one third the overall thickness of the plastic sheet, and preferably is less than one third the thickness of each of the exterior stratums 24.

This multi-layer composite plastic sheet utilized in the production of the cushioning dunnage product of the invention is available in commercial form from the Crown Zellerbach Corporation of Texas, and two preferable types are identified by it as "Crown Zeelon 305" composite film and "Crown Zellon 355" composite film.

Figure 5:
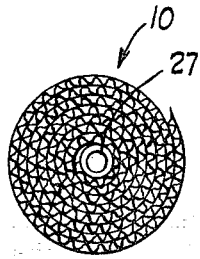
FIG. 5 is a diagrammatic, end elevational view showing a strip of the product of the invention as rolled into cylindrical form for ready transportation and/or storage.
Figure 7:
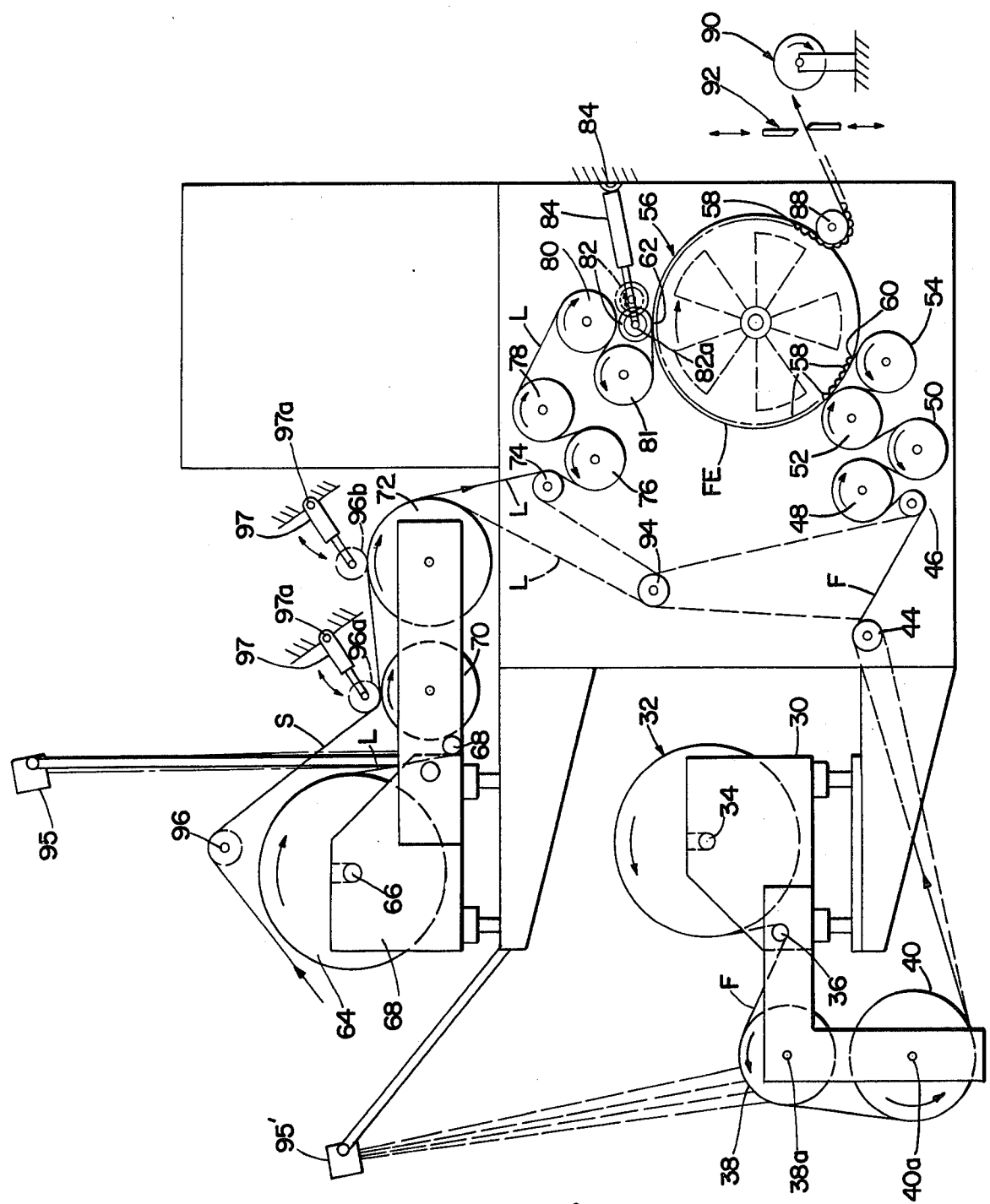
FIG. 7 is a side elevational, generally diagrammatic view of an apparatus utilizable in producing the product of the invention and in performing the method of producing the product.

FIG. 5 illustrates a roll of the embossed cushioning dunnage product as produced on the machine of FIG. 7, and disposed or rotated into roll form about a hollow core 27. The cushioning product utilizing the aforedescribed stock film provides gas barrier characteristics rated at no greater than approximately 10 to 12 c.c. per 100 square inches per 24 hours at one atmosphere at 72° F.

FIG. 7 illustrates diagrammatically, an apparatus for producing the cushioning product of the invention. In the embodiment illustrated the apparatus comprises a frame 30 on which may be rotatably mounted a supply roll 32 of the polyethylenenylon-polyethylene flexible plastic sheet or film material F, for rotation about a generally horizontal axis 34. The stock sheet material F is pulled off roll 32 and passes about a preferably stationary, generally horizontally oriented shaft 36 which is preferably coated with a layer of some friction reducing anti-adhesion material, such as for instance polytetrafluorethylene, otherwise known as "Teflon".

The sheet passes beneath shaft 36 and then passes over a heating roller 38 which is preferably non-driven (i.e. idler) about axis 38a on frame 30, but which roller should be maintained rotatable and movable with the film F at a surface speed at least not to exceed the speed of travel of the film. Roller 38 is preferably coated with a heat resistant anti-adhesion coating and is preferably heated to a temperature of between approximately 180° to 200° F. by any suitable means, such as for instance, by thermostatic controlled electric heating means of known type, embodied therein. Passage of the plastic sheet around the idler roller 38 causes it to be preheated to a temperature within the heat range of the idler roller of approximately 180° to 200° F.

The web of sheet material F then passes down around roller 40 (which is preferably an idler) which again is heated preferably to a temperature range of between approximately 180°–200° F. Roller 40 should be maintained rotatable and movable with the film F at a surface speed at least not to exceed the speed of travel of the film. If roller 40 is driven, it preferably is at a speed just slightly greater than the speed of roller 38. Roller 40 is, as illustrated, preferably of a larger diameter as compared to roll 38 and is rotatable about axis 40a on framework 30, in a generally similar manner as roll 38. Roller 40 is preferably surface coated with heat resistant anti-adhesion material in a similar manner as roller 38.

From roller 40, the web of plastic sheet moves about preferably non-heated idler roller 44 which again is preferably surface coated with a layer of anti-sticking heat resistant material, such as the aforementioned "Teflon". The sheet may be traveling at a rate of approximately 52 feet per minute, and therefore the temperature of the sheet is generally maintained even though it passes over non-heated roller 44, such sheet being maintained relatively close to the aforementioned 180°–200° F. temperature.

From idler roller 44, the sheet passes about heated roller 46 which preferably is at a temperature of between approximately 220°–270° F., roller 46 preferably being an idler roller. The sheet then passes about closely spaced rollers 48, 50, 52, 54, all of which are heated, and all of which, together with roller 46, preferably have an exterior surface coating thereon of heat resistant anti-adhesion material, such as the aforementioned "Teflon". Roller 48 is preferably at a temperature of between approximately 220°–270° F. Roller 50 is preferably at a temperature of between approximately 230°–290° F. Roller 52 is preferably at a temperature of between approximately 240°–320° F., while roller 54 is preferably at a temperature between approximately 260°–375° F.

All of the rollers 48, 50, 52 and 54 are power driven, are of approximately the same size, and are driven at the same speed. As the web of plastic sheet material passes about these rollers, the polyethylene stratums are melted and turned into substantially liquid form as carried by the nylon intermediate stratum of the sheet.

Figure 6:
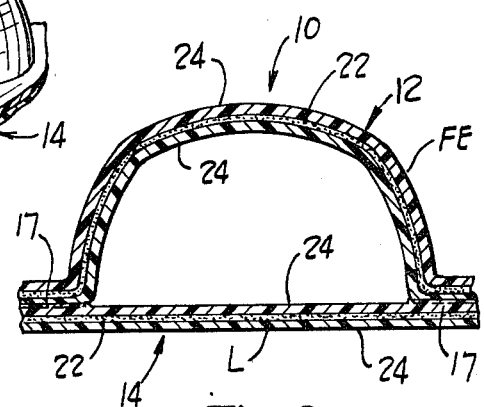
FIG. 6 is an enlarged, vertical sectional view of one of the air cells of the produced product, showing the stratums or defining layers of the plastic sheets utilized to produce the product.

From roller 54, the sheet material is immediately applied to an embossing drum 56, many types of which are known in the art. Embossment of the plastic film or sheet on the embossing drum 56 is preferably accomplished by a vacuum means (e.g. producing a vacuum of 5–7 inches of mercury) communicating with each individual depression 58, located on the surface of the embossing drum. The depressions 58 are conventionally connected by passages connecting with a vacuum manifold in the embossing drum 56 and coupled to a controlled source of vacuum. The forming drum 56 may be conveniently made of aluminum, with the surface thereof being preferably coated with a layer of adhesion preventing material, such as the aforementioned "Teflon" so that the preheated plastic sheet will not adhere to the surface of the forming drum 56 during the embossing operation. Although the drawings show a generally dome shaped defining surface of the depressions 58, as well as the exterior surface of the finished product (as shown in FIG. 6), it will be understood that the size, configuration and distribution of the embossments may be modified as desired so as to provide for different purposes or requirements. However, the dome shaped configuration illustrated is preferred for the embossed air cells.

The drum is preferably maintained at a temperature of between approximately 150°–155° F. Any suitable means can be utilized to maintain the temperature of the drum 56, with water being suitable, since it more expeditiously and economically enables maintenance of a more precise and controlled temperature, which is utilized in cooling the embossed film or sheet FE on the drum, as will be hereinafter described. Interior passages may provide for circulation of the water.

It will be seen from FIG. 7 that in the embodiment illustrated, the pre-heated plastic sheet or film F is preferably applied to the forming drum 56 near the latter's lowermost underside position, and is embossed as the drum rotates. At approximately 160 circumferential degrees on the drum (in the embodiment illustrated) from the initial point of application of the sheet F to the embossing drum 56, a laminating or cover sheet L is applied. Accordingly, since the embossing drum is at a temperature of between approximately 150°–155° F., and the embossed sheet FE is at a much higher temperature, cooling of the embossed sheet FE on the drum occurs as the drum rotates from position point 60 where the sheet F is first applied thereto, to the position 62 where the laminating or cover sheet L is applied to the cooled embossed sheet. Accordingly, the embossed sheet FE at point 62 is at a temperature of approximately 170°–180° F., the drum having cooled the embossed plastic sheet down to a temperature well below the melting temperature of the polyethylene exterior layers 24, and to a temperature approaching the softening or "tacky" temperature of the layers 24 (e.g. 160° F.) which is the temperature at which the polyethylene commences to change from a crystalline structure to an amorphous structure or vice versa.

The supply of laminating sheet L is preferably mounted on a roll 64 rotatably mounted about an axis 66 on upper frame 68 of the apparatus. Sheet L may be of a multi-stratum structure similarly to that aforediscussed for embossing sheet F, and generally similar to that shown in FIG. 4 of the application drawings. However, it will be understood that the thickness of laminating sheet L is preferably thinner than the thickness of embossing sheet F. In this connection, if the embossing sheet F is 2 mils in thickness, the laminating sheet L will be preferably 1.5 mil thickness.

From roll 64, the laminating sheet is pulled off to pass around non-heated, non-rotatable, rod 68 and then upwardly to pass onto heated preferably idler roller 70 which is preferably heated to a temperature within a range of approximately 180° to 200° F. similarly to aforediscussed roller 40 which coacts with the embossing sheet F. Roller 40 should be maintained rotatable and movable with film L, and at a surface speed at least not to exceed the speed of travel of the film L.

From roll 70, the laminating sheet passes around increased diameter roller 72 which is preferably heated to a similar temperature (i.e. 180°–200° F.) with roller 72 likewise being preferably an idler roll, but maintained rotatable and movable with the film, and at a speed at least not to exceed the speed of the film. The laminating sheet L then engages non-heated but driven roller 74 which is power driven by preferably conventional electrical motor means. Rollers 70, 72 and 74 as well as aforementioned rod 68, are preferably coated with a layer of anti-sticking material such as Teflon, in a similar arrangement and for the same purpose as in the other coated rollers.

From roller 74, the laminating sheet passes about heated roller 76 which preferably is at a temperature within a range of approximately 220°–270° F., thus raising the temperature of the laminating film as it passes about substantially a major extent of the circumference of roller 76. As can be seen, the laminating sheet preferably passes around about at least 240° of the total circumference of roller 76.

From roller 76 the laminating sheet L passes about roller 78 which is preferably at a temperature within the range of 230° to 290° F. This temperature is at least as great as the melting temperature of the polyethylene exterior layers on the laminating sheet L and thus insure that the polyethylene layers on the laminating sheet will be substantially liquid on the intermediate nylon layer, when the laminating sheet is applied to the embossed sheet on drum 56 at point 62 (FIG. 7).

From roller 78, the laminating sheet L passes about roller 80 which is preferably maintained at a temperature of approximately 330° F., thus raising the laminating sheet temperature well above the melting temperature of the polyethylene layers of the laminating sheet, and from roller 80 the sheet passes about a substantial portion of the exterior periphery of roller 81 which again is preferably maintained at a temperature of approximately 330° F. All of rollers 74 through 81 are power driven at the same speed and preferably have coverings of anti-sticking material thereon. Rollers 74 through 81 are driven at the same speed as aforementioned rollers 46 through 54, (may be geared to the same source of power) and which speed is slightly slower than the speed of rotatably driving of the forming drum 56. As an example, the speed of the heating rollers 48–54 and 74–81 may be approximately 52.17 lineal ft. per minute while that of the forming drum 56 may be 52.24 lineal ft. per minute.

From roller 81 the laminating sheet is directed toward the periphery of the embossing or forming drum 56 where the pressure engagement of the laminating sheet L with the exterior or confronting surface of the embossed sheet FE is accomplished at point or line 62 by means of generally linearly movable nip roller 82. Roller 82 is preferably at a temperature of approximately 300° to 320° F., includes a resilient layer of for instance silicone rubber, which in turn is "Teflon coated", and is movable to and from engagement with the exterior of the laminating sheet L as by means of the pair of spaced double acting air cylinders 84 disposed on each end of the rotary axis 82a of the roller 82, and coacting therewith so as to direct the nip roller 82 toward the line engagement of the laminating sheet with the embossed sheet upon actuation of motor units 84.

Motor units 84 are preferably pivoted as at 84a to a support portion of the apparatus frame thus providing for relative pivotal movement of the motor units with respect to the supporting frame. Motor units 84 preferably provide a total pressure of approximately 16–17 pounds force on the rotatable axle of roller 82, (approximately 0.7 pounds per lineal inch for a 2 foot long roller 82) although a lesser pressure, and as for instance, 5 pounds would result in an adequate bonding of the laminating sheet L to the embossed sheet FE; however 16–20 pounds pressure is preferred, with there being an upper limit of approximately 35 pounds total pressure. Roller 82 is approximately the same length as drum 56. Since the laminating sheet as it is applied to the embossed sheet is at a temperature of approximately 330° F., well above the melting temperature of the polyethylene stratums, a positive fusion or heat seal bond occurs between the laminating sheet and the embossed sheet, with the laminating sheet passing heat to the confronting polyethylene layer on the embossed sheet, so as to cause melting of the confronting polyethylene layer on the embossed sheet and together with the pressure and heat applied by roller 82 providing for a secure bond between the laminating and embossed sheet layers. It will be understood that the laminating sheet L and roller 82 raises the confronting layer 24b of the cooler embossed sheet from a temperature approaching its softening temperature (due to the cooling action of the drum) to its melting temperature, thus bonding together layer 24b of the embossed sheet FE and the adjacent melted layer 24 of the laminating sheet. It is believed that the underlying non-virgin polyethylene layer 24a of the embossed sheet does not melt, with substantially only layer 24b melting due to heat transfer from hot laminating sheet L.

The sealed cushioning dunnage product is then moved about the surface of the embossing drum from the point of engagement of the laminating sheet with the embossed sheet, to the anti-stick coated, driven roller 88 which preferably is at a temperature of approximately 100° F., and thus the cushioning dunnage product, further cooled by the drum is stripped off the forming drum 56 and directed to another location such as for instance to rotatable accumulator 90, where it can be disposed in rolled form and as is illustrated for instance in FIG. 5 of the drawings, for convenient handling and/or storage thereof. By maintaining the "stripoff" roller 88 at the indicated temperature, wrinkles in the finished product are aided in being prevented. Roller 88 and accumulator 90 are driven at the same surface speed as drum 56. A cutter unit 92 of any suitable type may be provided for severing an accumulated roll of air cell product from the producing apparatus. The produced product illustrated in FIGS. 1–6 has a "clear" or "see through" appearance, which enhances its desirability and saleability. This "clear" or "see through" characteristics is at least in part, due to the cooling of the embossed film on the drum to approaching its softening temperature or heat softening point as it is identified in the art, and just prior to application of the laminating sheet thereto.

Referring now specifically again to FIG. 7, there is shown an alternate path in dashed lines, for movement of the laminating sheet, by the provision of an additional idler roller 94 which is rotatable about a horizontal axis, and which is preferably coated with a layer of antiadhering material, such as the aforementioned "Teflon". The laminating sheet can pass about roller 94 prior to passing about roller 74, thus providing for an additional drying time of a coating applied to the laminating sheet L as by means of a spray head 95 (FIG. 7) adjustably supported on frame 68. Such coating could be, for instance, an anti-static coating sprayable in liquid form onto sheet L as it passes from stock roll 64 around shaft 68 and roller 70.

This anti-static material is a commercially available item and can be purchased under the tradename of Staticide General Purpose, obtainable from Analetical Chemical Laboratories of Elk Groove Village, Il. 60007. This material provides for rapid dissipation of any electrical static charges which may occur and which may be detrimental in the use of the product.

Spray head 95' may likewise apply a coating, such as the aforementioned anti-static material, to the embossing sheet F, with the latter passing about an idler roller, such as roller 94, to provide drying time, prior to passing to the heating rollers 46 thru 54 and as illustrated in dashed lines in FIG. 7.

In any event, it will be seen that both sheets, sheet F to be embossed, and the laminating or cover sheet L, are generally simultaneously passed about groups of heating rollers which have generally increasing temperatures, to progressively increase the temperature of the sheet material, with the laminating sheet L being applied under pressure to the confronting surface of the embossed sheet well above the melting temperature of the polyethylene stratum of the sheet while at the time that the embossed sheet has been cooled by the forming drum to a temperature well below the melting temperature of the polyethylene and is at a temperature approaching the softening temperature of the latter. This enables good control of the embossed sheet, and the maintenance of the film clarity of the transparent air cell product, but yet provides for a positive sealing of the laminating sheet L to the embossed sheet FE, thus maintaining the integrity of the air cells, and the excellent cushioning characteristics of the product.

The cushioning dunnage product aforedescribed meets and in certain instances, surpasses the Federal Specifications entitled Cushioning Material, Flexible Cellular, Plastic Film For Packaging Applications, of the Federal General Services Administration, and identified as PPP-C-795A dated Dec. 2, 1970.

In addition, it has been found that the produced air cell product aforedescribed has very good "creep resistance", and that the creep resistance of the air cell product with a greater height of air cell (e.g. ½ inch high) is greater (has a greater resistance to creep) as compared to an air cell product with a lesser cell height (e.g. 5/16 inch high) utilizing the same thickness of film stock material, even though the greater height air cell product demands or results in a greater thinning or drawing of the film during the embossing operation to form the air cells. In any event, the resistance to creep or loss of air from the cells, under load, is extremely good for the formed air cell product of the invention, irrespective of the cell height, but as aforesaid is even better for the greater air cell heights of product.

Referring again to FIG. 7, an arrangement is illustrated for selectively applying a liner sheet or strip S to the laminating or cover sheet L prior to the latter's being applied to the embossed sheet FE on the drum at application point or station 62. The liner strip may be supplied from a supply source, such as a roll of the liner (not shown) rotatably mounted, and adapted to be pulled off therefrom over idler roller 96, from which the liner strip S passes between retractable nip rollers 96a and 96b coating respectively with aforementioned heating rollers 70 and 72, whereby the liner strip is heat bonded to the laminating strip or sheet L. Liner S may be any suitable material, such as for instance Kraft paper, or foil, or flexible plastic foam such as for instance, polypropylene foam, or the like.

Nip rollers 96a, 96b are preferably heated (but may not be) as by means of electric heating elements embodied therein, similarly to the heating rollers, and apply suitable pressure to the liner S in superimposed relation to sheet L, to cause adherence therebetween. Such a liner covered air cell product can be used in the production of air cell envelopes or pouches, as will be hereinafter discussed in greater detail. Reciprocal, fluid powered motor units 97, pivotally mounted as at 97a, may be used to project and retract the nip rollers 96a, 96b.

Figure 8:
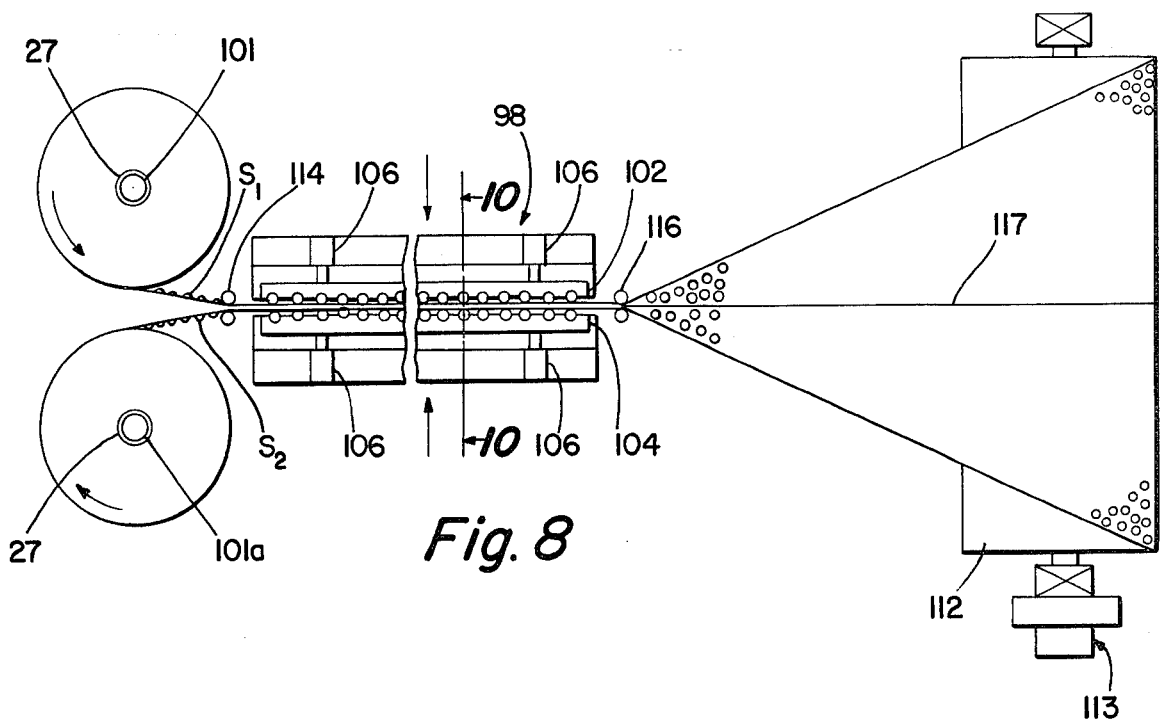
FIG. 8 is a diagrammatic, top plan view of a mechanism for mounting a plurality of the rolls of produced product of selected widths, and connecting such widths of product together by heat sealing confronting edges thereof, to produce a roll of product having a width of generally the sum of the widths of the original individual rolls.
Figure 9:
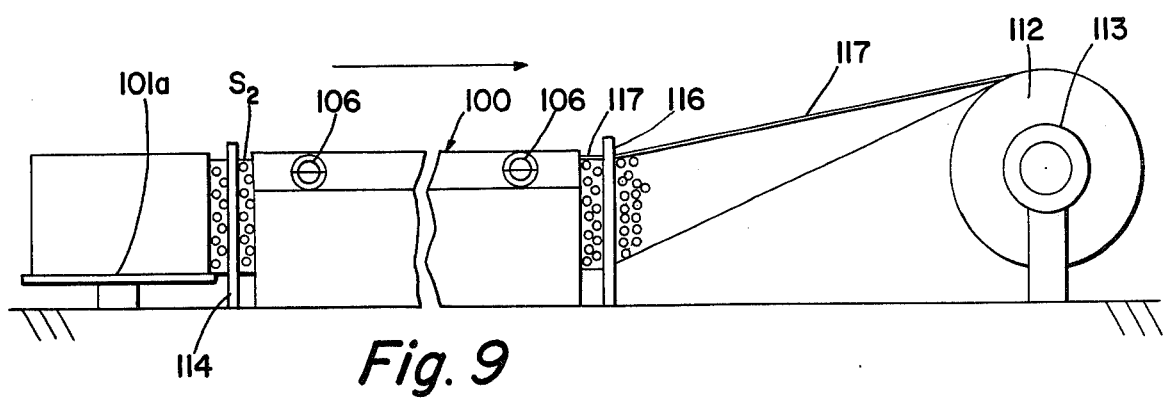
FIG. 9 is a diagrammatic, side elevational view of the FIG. 8 mechanism.
Figure 10:
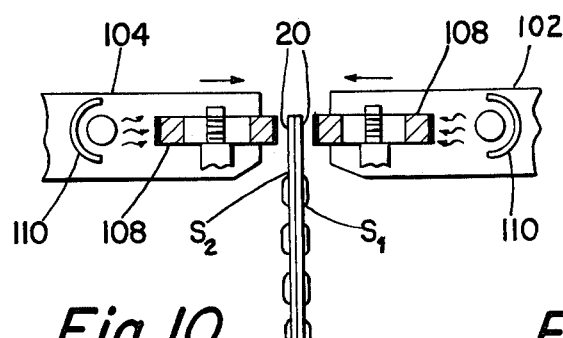
FIG. 10 is an enlarged, vertical sectional view taken generally along line 10—10 of FIG. 8 looking in the direction of the arrows and illustrating details of the heat sealing rollers of the mechanism of FIGS. 8 and 9.

Referring now to FIGS. 8 through 10, there is disclosed diagrammatically, a mechanism 98 identified as a width extender mechanism, for connecting together along side edge margins thereof a plurality of the strips of air cell product produced on the apparatus of FIG. 7, for providing for the expeditious and selective increasing of the width of strip of air cell material. Such extender mechanism, in the embodiment illustrated, includes heat-pressure means 100, for heat bonding together confronting side edge margins of a plurality of the strips of air cell product. Such strips S1, S2 of air cell product may be of the type illustrated for instance, in FIGS. 1 to 6, including side margin areas 20, and which have been wound into roll form as illustrated in FIG. 5, and mounted vertically for rotational movement (in the embodiment illustrated on rotatable platforms and axles 101, 101a) and which provide for ready pulling of the strips S1, S2 of air cell material simultaneously off the rolls thereof and passing it through the heat-pressure means 100, to seal the confronting and abutting marginal edges 20 (FIG. 10) together.

Means 100 may include movable jaw portions or supports 102, 104 coupled to reciprocal double acting, fluid powered motor units 106, for urging the jaw portions 102, 104 toward one another to cause sealing bonding engagement between the abutting margins of the vertically oriented strips S1, S2 of air cell material.

In this embodiment, the heat-pressure sealing means includes a plurality of opposing idler roller members 108 mounted on the respective jaw, with such roller members formed for instance of yieldable heat resistance material, such as silicone rubber coated with an anti-adhesion material, such as "Teflon", and maintained for instance, at a temperature of 450° F., so that when the jaws are moved toward one another, the rollers 108 are rollingly engaged in pressurized relation with the interposed marginal sections 20 of the vertically oriented air cell product. The applied heat and pressure causes a melting of the confronting layers of polyethylene (assuming that the air cell product is made of the film stock having the composite structure aforediscussed in connection with FIGS. 1 through 6) to cause heat sealing of the strips S1, S2 together at their marginal edges. 110 designates a heating means for the rollers which in this case is illustrated as being infrared heaters and associated reflector means, mounted in jaws 102, 104.

The strips S1, S2 of air cell material may be passed through the width extender mechanism 98 at speeds of, for instance, 100 lineal feet per minute, with the connected strips, after being connected by the heat sealing means 100, being folded or spread outwardly from the lower edges thereof, and as illustrated in FIGS. 8 and 9, and wound on powered roller 112, which may be driven by any suitable means, such as for instance, by electric motor and associated clutch means 113.

Vertical guides 114, 116 may be provided for guiding the movement of the strips S1, S2 of thermoplastic air cell material through and from the heat-pressure connecting means 100, with such guides, in the embodiment illustrated, being laterally spaced pairs of vertical columns. Thus, it will be seen that with the width mechanism 98, different widths of air cell material can be produced, attached as at 117, along a generally central lengthwise running flange or web, which may utilize only a portion of the width of margin on each of the produced air cell strips S1 and S2.

Referring now to FIGS. 12 through 24, there is illustrated various other embodiments of air cell products formed from air cell sheeting produceable on the apparatus of FIG. 7 and which may be of the general type of air sheeting illustrated for instance in FIGS. 1-6. FIGS. 11 and 12 which are respectively fragmentary side elevational and top plan views, illustrate an air cell product 119 having a reinforcing wire or line 120 running along at least one marginal edge of the produced air cell product, with the edge 18 having been folded about the wire or line and heat sealed as at 122. Line 120 may be formed of any suitable material, such as for instance plastic, or metal, or other suitable materials, such as cordage, and the edge 18 may be heat sealed down about line 120 continuously or intermittently, to trap the member 120 in encompassed relation by a portion of the marginal edge of the air cell product 119.

FIG. 13 illustrates a similar arrangement of folding over the marginal edge and heat sealing the same to the confronting portion of the marginal edge area, and as at 124, but wherein no wire or line 120 is embodied therewith, such overlapped heat sealed section 125 strengthening and rigidifying the edge of the air cell product 126.

FIGS. 14 and 15 disclose respectively fragmentary elevational and top plan views of an air cell product 128 which embodies a ribbon 130 running lengthwise of the strip of air cell material with the ribbon 130 being adhered to the distal edge 18 of the air cell strip. Ribbon 130 may or may not be heat sealable, but preferably is and may be attached by heat sealing pressure to the ribbon and adjacent marginal edge of the product.

FIG. 16 discloses a somewhat similar product 128' wherein a ribbon 130 of material is disposed both on the upper and lower surfaces of the marginal edge of the air cell product, and is secured thereto, while FIG. 17 discloses an air cell product 128" wherein the ribbon 130 is secured only to the underside of the marginal edge of the air cell product.

FIGS. 18 and 19 disclose fragmentary elevational and top plan views of an air cell product 132, in which a wire or line 120 has been combined with a ribbon 130 of the types of FIGS. 14 through 17, and oriented along the marginal edge of the product, to rigidify the marginal edges as well as providing a convenient arrangement for suspending the air cell product from a support. FIGS. 20 and 21 disclose various other embodiments wherein FIG. 20 discloses a product arrangement 132' with the combined wire and ribbon 120, 130, disposed at the distal edge of the margin of the air cell product, while FIG. 21 discloses an embodiment wherein the combined wire or line 120 and ribbon 130 are disposed on the underside of the air cel product 132".

FIGS. 22 and 23 disclose respectively a fragmentary, exploded elevational view and a top plan view, of an air cell product 133 wherein joiner strips 134, 134a which include respectively a lengthwise running male projection 136 and a complementary female recess 138, are secured to at least one marginal edge of a respective sheet 139, 139a of the air cell product, for receiving in the female recess and in snap fastened or engaged holding relation, the male portion 136 of confronting joiner strip 134, for releasibly holding the distal edges of the air cell sheeting together in assembled relation. Joiner strips 134, 134a may be formed of for instance heat sealable plastic, and provide for rapid opening and closing of such connected air cell sheeting members 139, 139a. The other edges of the sheeting members may be connected by permanently heat sealing the same as at 140. Such an arrangement could be conveniently utilized in the formation of envelopes or other like receptacle packaging, to thus provide a product where the air cells 16 project inwardly toward one another (or outwardly away from one another if the air cells are arranged exteriorly) in a receptacle type environment. All or only certain of the marginal edge of the formed envelope member could be provided with the releasable joiner mechanism 134, 134a with the non-openable marginal edges being able to be heat sealed together in permanent secured relation.

FIG. 24 is a fragmentary sectional view wherein a separate joiner member 142 formed of suitable material, such as plastic, is provided with opposing recesses 144, 144a, for receiving therein an enlarged, male projection, marginal edge 146 of an air cell sheet, such as for instance the arrangement shown in FIG. 20, thus releasibly connecting together adjacent sheets of the air cell sheeting. Joiner member 142 could run the full length of the connector air cell sheets 132', or spaced members 142 could be used, spaced lengthwise along the juncture of sheets 132'.

Figure 26:
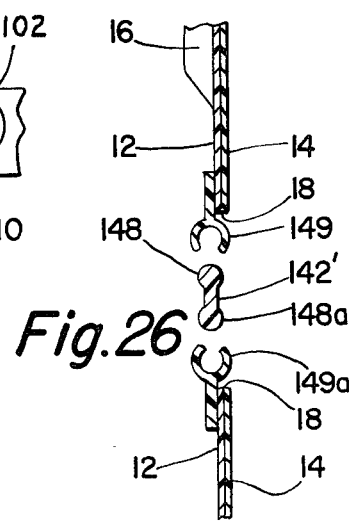

FIG. 25 illustrates an air cell sheeting product wherein a stiffening member 120 is entrapped between the heat bonded margin areas 20 of sheets 12 and 14, while FIG. 26 illustrates a joiner arrangement similar to FIG. 24, except that the joiner member 142' of suitable material such as plastic, comprises male projections 148, 148a adapted to be received in secured relation in female members 149, 149a, heat bonded to marginal edge portions of the respective air cell sheeting, to attach the latter together along side edges thereof.

From the foregoing description and accompanying drawings it will be seen that the invention provides a novel method and apparatus for the production of transparent air cell material, such as for instance air cell cushioning dunnage material, with the product comprising an embossed layer of flexible plastic sheet and a cover layer of flexible plastic sheet secured together by heat-pressure bonding, and defining a plurality of spaced closed air cells therebetween, with each of the sheet layers including means generally impervious to passage of gases therethrough and providing substantial strength and tear and puncture resistance, and with the air cell product having side edge margins of predetermined width running lengthwise of the air cell material, with the sheets being bonded together along such side edge margins and intermediate the air cells with such marginal edges being free of any air cells, thereby providing a defined strip of the air cell product. The laminating sheet in the method of the invention is heated to a temperature well above the melting temperature of the exterior stratum of the sheet and is applied to the embossed sheet which at the moment of application of the laminating sheet thereto has been cooled by the embossing drum to a temperature well below the melting temperature, and to a temperature approaching the softening point temperature of the exterior stratum, with the laminating sheet being sufficiently hot so that the heat thereof when applied to the embossed sheet will cause melting of the confronting surface of the embossed sheet, and with applied pressure and heat provides an expeditious heat sealed bone between the sheets. The method and apparatus are such that the machine can be halted in its operation without producing injurious effects or problems to the machine and/or the air cell product being formed, and can be restarted to again commence production of the air cell product.

The terms and expressions which have been used are used as terms of description, and not of limitation, and there is no intention, in the use of such terms and expressions, of excluding any equivalents of the features shown and described or portions thereof, but it is recognized that various modifications are possible within the scope of the invention claimed.

What is claimed is:

1. In a method of manufacturing air cell cushioning dunnage material from flexible plastic sheet, with each of the sheets comprising a composite of an intermediate stratum of high density thermoplastic material generally impervious to the passage of gas therethrough and exterior stratums bonded to the intermediate stratum with the exterior stratums being formed of low density low melting point thermoplastic, with said intermediate stratum being of a high density, higher melting point material as compared to that of the exterior stratums, comprising the steps of heating a first of the composite sheets to a temperature above the melting point temperature of the exterior stratums but below the melting point temperature of the intermediate stratum, embossing said heated first sheet by feeding it onto a rotating forming drum having a plurality of recesses therein and forming the air cells in the recesses on said forming drum by vacuum, heating a second composite sheet of the plastic above the melting point of the exterior stratums of said second sheet, cooling by means of said drum the embossed sheet while on said rotating drum to a temperaure below said melting point temperature of said exterior stratums and to a temperature approaching the softening temperature of the exterior stratums, and then applying said second sheet to said first cooled sheet after the latter has been cooled to said temperature approaching said softening temperature whereby the residue heat in said second sheet causes a melting of the confronting exterior stratum of the cooled embossed sheet sufficiently to cause a bonding of the said first and second sheets at the areas of engagement while on the drum so as to seal the air cells in said product, and then removing the cushioning product from the forming drum.

2. A method in accordance with claim 1 wherein the first sheet is heated to a temperature in the range of 260°–375° F. just prior to its being applied to the forming drum, and the second sheet is heated to a temperature of approximately 330° F. just prior to its being applied to the embossed sheet on the forming drum.

3. A method in accordance with claim 2 wherein the embossed sheet on the forming drum is cooled to a temperature of between approximately 170°–180° F. prior to application of the second sheet thereto.

4. A method in accordance with claim 1 including the step of utilizing pressure on the second sheet to urge it into positive adhering contact with the embossed sheet on the forming drum.

5. A method in accordance with claim 4 wherein said applied pressure is between approximately 0.21 to 1.46 pounds per lineal inch, and is applied along generally line contact transverse of said second sheet by means of a rotatable heated roller approximately 2 feet long urging said second sheet into adhering contact with said embossed sheet on the forming drum along said line contact.

6. A method in accordance with claim 1 wherein the first sheet is progressively heated to a temperature of between approximately 260°–375° F. by means of heated roller means prior to application to the forming drum, the first of which roller means is at a temperature of approximately 180°–200° F.

7. A method in accordance with claim 1 including the step of applying anti-static material to at least one of said sheets prior to its being applied to the other on the forming drum.

8. A method in accordance with claim 1 wherein the first sheet is progressively heated to a temperature of between approximately 260°–375° F. by means of heated roller means engaging the first sheet prior to application of the latter to the forming drum, and including the step of driving said roller means at a slower speed as compared to the speed of driving the forming drum.

9. A method in accordance with claim 1 including the step of applying a liner sheet to the second sheet and securing the same together by means of pressure prior to application thereof to the embossed sheet on the forming drum.

10. A method in accordance with claim 9 wherein said liner sheet is formed of paper.

11. A method in accordance with claim 1 wherein the first sheet is initially passed about a roller maintained at a temperature of approximately 180°–200° F. and of a predetermined diameter, and then is passed around another roller maintained at a temperature in the range of approximately 180°–200° F. with the second roller being of a greater diameter as compared to that of the first roller, and then passing the first sheet about a further roller which is non-heated, then passing the first sheet about a further roller which is maintained at a temperature of between approximately 220°–270° F., then about a further driven roller which is maintained at a temperature of between approximately 220°–270° F. and then about a further driven roller which is maintained at a temperature of between approximately 230°–290° F., then about a further driven roller which is maintained at a temperature of between approximately 240°–320° F., then about a further driven roller which is maintained at a temperature of between approximately 260°–375° F., and then is applied to the forming drum which is maintained at a temperature of between approximately 150°–155° F.

12. A method in accordance with claim 4 including subsequent removal of said utilized pressure on the second sheet.

13. A method in accordance with claim 1 wherein said exterior stratums are polyethylene, said first sheet being heated to a temperature in the range of 260°–375° F. just prior to its being applied to the forming drum for embossment thereof, the second sheet being heated to a temperature of approximately 330° F. just prior to its being applied to the cooled embossed sheet on the forming drum, said cooled embossed sheet being at a temperature of between approximately 170°–180° F. prior to application of the heated second sheet thereto, and including the step of applying pressure on the second sheet to urge it into positive adhering contact with the cooled embossed sheet upon said application of the heated second sheet to the cooled embossed sheet.

14. A method in accordance with claim 13 wherein the forming drum is maintained at a temperature of between approximately 150°–155° F. to accomplish said cooling of the embossed sheet, and including the step of further cooling the adhered first and second sheets on the rotating drum prior to removing the cushioning product therefrom.

15. A method in accordance with claim 9 wherein said liner sheet is formed of foil.

16. A method in accordance with claim 9 wherein said liner sheet is formed of flexible foam.

17. In a method of manufacturing air cell cushioning dunnage material from a plurality of flexible thermoplastic sheets, each of said sheets comprising a composite of a stratum of high density, high melting point material generally impervious to the passage of gas therethrough and another stratum bonded to the first mentioned stratum with said other stratum being formed of low density, low melting point thermoplastic, and with said first mentioned stratum being of a higher density, higher melting point material as compared to said other stratum, comprising the steps of heating a first of the sheets to a temperature above the melting point temperature of the other stratum but below the melting point temperature of the first mentioned stratum to provide for hot embossment of the sheet, embossing said heated first sheet by feeding it onto a rotating forming drum having a plurality of recesses therein and forming the air cells in the recesses on said forming drum by vacuum; heating a second sheet of the thermoplastic above the melting point of the other stratum of the second sheet, cooling the embossed sheet while on said rotating drum to a temperature below said melting point temperature of said other stratum by maintaining said drum at a predetermined temperature below the first mentioned temperature, and so as to cool said embossed sheet by means of said drum to a temperature approaching the softening temperature of said other stratum thereof, and then applying said second heated sheet to said first sheet after completion of said embossing and said cooling, whereby the residue heat in said second sheet causes a melting of the confronting surface of said other stratum of the cooled embossed sheet sufficiently to cause a bonding together of said other stratums of the said first and second sheets at the areas of engagement while on the drum so as to seal the air cells in said product, and then removing the cushioning product from the forming drum.

18. A method in accordance with claim 17 including the step of utilizing a heated roller to apply both pressure and further heat to said second sheet to urge it into positive adhering contact with the embossed sheet on the forming drum.

19. A method in accordance with claim 18 wherein said applied pressure is between approximately 0.21 to 1.46 pounds per lineal inch and is applied by means of a rotatable heated roller approximately two feet long engaging said second sheet along generally line contact extending transverse of said first sheet on said drum, and urging said second sheet into adhering contact with said cooled embossed sheet on the forming drum.

20. A method in accordance with claim 17 including the step of applying anti-static material to at least one of said sheets prior to its being applied to the other on the forming drum.

21. A method in accordance with claim 17 wherein the first sheet is progressively heated to a temperature above the melting point of its other stratum by means of heated roller means engaging the first sheet prior to application of the latter to the forming drum, and including the step of driving said roller means at a slower speed as compared to the speed of driving the forming drum.

22. A method in accordance with claim 17 including the step of applying a liner sheet to the second sheet and securing the same together by means of pressure prior to application thereof to the embossed sheet on the forming drum.

23. A method in accordance with claim 18 including subsequent removal of said utilized pressure on the second sheet.

* * * * *